United States Patent [19]

Inoue et al.

[11] Patent Number: 4,603,391
[45] Date of Patent: Jul. 29, 1986

[54] FEED-DEVIATION PREVENTIVE NUMERICALLY CONTROLLED EDM METHOD AND APPARATUS

[75] Inventors: Kiyoshi Inoue, Tokyo; Akihiko Shimizu, Kanagawa, both of Japan

[73] Assignee: Inoue-Japax Research Incorporated and Japax Incorporated, Kanagawaken, Japan

[21] Appl. No.: 545,147

[22] Filed: Oct. 25, 1983

[30] Foreign Application Priority Data

Oct. 27, 1982 [JP] Japan .............................. 57-187545

[51] Int. Cl.$^4$ ..................... B23P 1/00; G05B 19/00
[52] U.S. Cl. ........................... 364/474; 219/69 G; 219/69 W
[58] Field of Search ............ 364/474, 475; 219/69 W, 219/124.21, 121 EH, 121 EV, 121 EU, 121 EW, 131 EX, 121 EY, 69 G

[56] References Cited

U.S. PATENT DOCUMENTS

| | | | |
|---|---|---|---|
| 3,975,608 | 8/1976 | Ullmann et al. | 219/69 G |
| 4,021,635 | 5/1977 | Losey et al. | 219/69 G |
| 4,071,729 | 1/1978 | Bell, Jr. | 219/69 G |
| 4,150,275 | 4/1979 | Wavre | 219/69 G |
| 4,152,569 | 5/1979 | Bell, Jr. et al. | 219/69 G |
| 4,238,660 | 12/1980 | Bell, Jr. et al. | 219/69 G |
| 4,296,302 | 10/1981 | Bell, Jr. et al. | 219/69 G |
| 4,301,349 | 11/1981 | Inoue | 219/69 W |
| 4,366,359 | 12/1982 | Yatomi et al. | 219/69 W |
| 4,418,263 | 11/1983 | Inoue | 219/69 W |

FOREIGN PATENT DOCUMENTS

| | | | |
|---|---|---|---|
| 2053514 | 2/1981 | United Kingdom | 219/69 W |
| 2116751 | 9/1983 | United Kingdom . | |

Primary Examiner—Jerry Smith
Assistant Examiner—Allen MacDonald
Attorney, Agent, or Firm—Karl F. Ross; Herbert Dubno

[57] ABSTRACT

An NC-EDM machine is safeguarded against feed errors arising from both mechanical and erosive-machining effects. The disclosed safety arrangement includes two detecting circuit units. The first unit is arranged to respond to NC-furnished driving command signals for producing a first detection signal representative of a commanded relative displacement to be effected between the tool electrode and the workpiece along a programmed machining path in a given time period. The second detecting unit is arranged to respond to effective electrical discharges caused in the EDM gap to produce a second detection signal representative of an actual relative displacement effected between the tool electrode and the workpiece along the path in the given time period. A comparator is connected to the two detecting units for comparing the first and second detection signals to produce an output signal indicative of a deviation of the actual advancement from the commanded advance.

18 Claims, 4 Drawing Figures

FEED-DEVIATION PREVENTIVE NUMERICALLY CONTROLLED EDM METHOD AND APPARATUS

FIELD OF THE INVENTION

The present invention relates to numerically controlled electroerosion or electrical discharge machining (EDM) in which a drive means operates under commands of a numerical controller to advance a tool electrode and a workpiece relatively along a programmed feed path while material removal from the workpiece proceeds by means of successive electrical discharges across a machining gap maintained between the relatively advancing tool electrode and the workpiece whereby a desired form is generated in the workpiece. In particular the invention relates to an improved method and apparatus as described in which a safeguard against machining error is provided.

BACKGROUND OF THE INVENTION

In the last decade, EDM machines have been increasingly adapted to operate with numerical control (NC) systems for controlling the machining feed required to achieve a desired machining geometry. This increased use of NC systems is reflected in present-day widespread use in industry of highly automated traveling-wire (TW) and other "generic electrode" EDM machines capable of machining a die, mold or like highly intricate or "difficult to machine" articles more efficiently than ever before. While an NC system may also be employed for sinking-type EDM machines utilizing a formed tool electrode, the EDM capabilities have been largely expanded in the form of "generic electrode" EDM machines equipped with an NC unit. In these machines, the tool electrode is a wire, tape, cylindrical rod or like simple electrode and may be used to impart a complex shape to a workpiece with due precision.

Dies, molds or like articles have their own severe specifications to meet particular purposes so that each must be prepared from a relatively expensive blank and yet machined individually with an extremely high degree of machining precision. Furthermore, an extensive machining time ranging from an hour to days is needed to finish generating a required shape in a blank. Since a die, mold or like article which can be efficiently machined with a numerically controlled (NC) EDM machine is thus of high value and cost, any machining error during the course of machining is a critical problem.

In an NC-EDM machine, the assigned function of the NC system is to effect the machining feed required to follow up discharge-erosion at the gap and to enable the discharge-erosion to continue precisely along a programmed path. The machining feed is effected by means of a succession of drive pulses based upon digital commands programmed on a record medium so that the desired relative advancement may be performed as accurately as possible in accordance with the programmed commands. Motor means such as a DC motor or stepping motor for energization with the drive pulses is drivingly coupled with a drive member such as a leadscrew which is in turn connected to support means for the movable tool electrode or workpiece. Each individual drive pulse is, for the sake of precision, typically designed to effect an increment of the relative advancement as small as 1 μm, and is furnished over a very small fraction of a second. Such successive drive pulses need to be consecutively furnished to the motor means throughout the machining operation over an extensive time period as mentioned above to maintain the machining feed precisely along the programmed feed path.

Such drive systems, however, commonly entail conversion of electrical to mechanical signals and further mechanical conversion of rotary to longitudinal signals or displacements. Thus, it has been recognized that a mechanical error may develop in the stages of conversion due, for example, to an error in the lead or pitch of a leadscrew and in backlash in various components. Furthermore, of even greater importance is the discovery that changes in gap conditions and machining parameters including electrode geometry may prevent each NC command from being precisely reflected in an actual distance of erosive material removal and hence on the corresponding machining feed or relative displacement. As a result, it is possible that minor deviations occurring from time to time for one or more of these reasons can accumulate to result in a serious machining error in the workpiece and consequent irreparable damage thereof.

OBJECT OF THE INVENTION

The present invention, therefore, seeks to provide an improved numerically controlled electroerosive machining method and apparatus whereby workpiece damage due to such machining errors is effectively prevented.

SUMMARY OF THE INVENTION

In accordance with the present invention there is provided, in a first aspect thereof, a numerically controlled method of electroerosively machining a workpiece with a tool electrode herein a succession of electrical voltage pulses are applied between the tool electrode and the workpiece and at least partly result in effective electrical discharges across a machining gap to electroerosively remove material from the workpiece while drive means is furnished with a sequence of incrementally driving command signals from a numerical controller for relatively advancing one of the tool electrode and the workpiece into the other to continue machining of the workpiece along a programmed path, which method comprises: (a) sensing the said command signals to produce a first detection signal representative of a commanded relative advance to be effected between the tool electrode and the workpiece along the said programmed path for a given time period; (b) sensing the effective electrical discharges caused in the machining gap to produce a second detection signal representative of an actual advance effected between the tool electrode and the workpiece along such path in such time period; and (c) comparing the said first and second detection signals to produce an output signal indicative of a deviation of the said actual advance from the said commanded advance.

Specifically, the first detection signal may be a first train of signal pulses whose number for said time period is representative of a distance of the said commanded advancement for the said time period, and the second detection signal may be a second train of signal pulses whose number for the given time period is representative of a distance of the actual advance for that time period. Each of the signal pulses of the first train may generated upon occurrence of each of the incrementally driving command signals representing a command for relative advancement by a predetermined unit distance to be incrementally effected between the tool electrode and the workpiece. Each of the signal pulses of the second train may be generated upon occurrence of a predetermined number of the effective electrical discharges. Each of said signal pulses of the second train may also be generated upon ascertaining that a unit distance of material removal nominally equal to the said commanded unit distance of relative advancement is achieved by a number of the effective electrical discharges in the machining gap.

The method according to the invention preferably further comprises, in conjunction with step (b), the steps of establishing a value for the amount of material removal effected by each effective electrical discharge and deriving from the said value said number of effective electrical discharges. In conjunction with step (b), the said unit distance of material removal may be determined at least from said predetermined unit distance of relative advancement, and the amount of material removal per each effective electrical discharge and the area in the workpiece through which material removal occurs for the said number of effective electrical discharges. It should be noted that the amount of material removal per each effective electrical discharge can be determined as a function of the current magnitude and the pulse duration of the effective electrical discharge. The said area in the workpiece can be determined as a function of the current magnitude and the pulse duration of said effective electrical discharge. The said number of the effective electrical discharges can be determined from said predetermined unit distance of relative advancement and the determined unit distance of material removal.

The invention also provides, in a second aspect thereof, an electroerosion machining apparatus having electrical power supply means for applying a succession of electrical voltage pulses between a tool electrode and a workpiece with the pulses at least partly resulting in effective electrical discharges across a machining gap to electroerosively remove material from the workpiece, and a numerical controller for furnishing drive means with a sequence of incrementally driving command signals to relatively advance one of the tool electrode and the workpiece into the other to continue machining of the workpiece along a predetermined path, which apparatus includes: first detection means responsive to said driving signals for producing a first detection signal representative of a commanded relative advance to be effected between the tool electrode and the workpiece along the said predetermined path in a given time period; second detection means responsive to the effective electrode discharges caused in the machining gap to produce a second detection signal representative of an actual relative advance effected between the tool electrode and the workpiece along such path in such time period; and comparison means connected to the first and second detection means for comparing said first and second detection signals to produce an output signal indicative of a deviation of said actual advance from said commanded advance.

BRIEF DESCRIPTION OF THE DRAWINGS

These and other features of the present invention as well as advantages thereof will become more readily apparent from the following description when taken with reference to the accompanying drawings in which.

SPECIFIC DESCRIPTION

Figure 1:
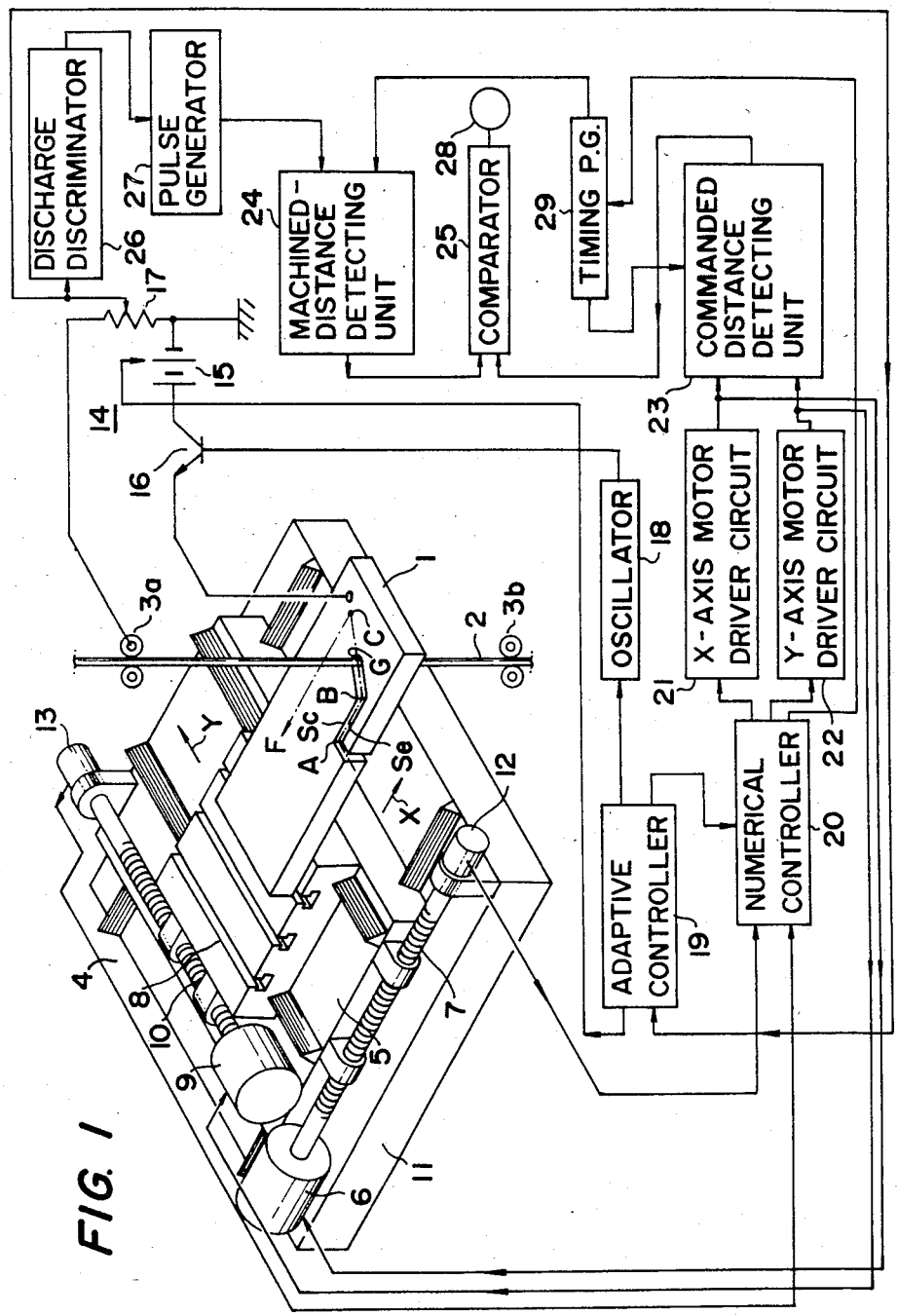
FIG. 1 is a schematic view partly in perspective and partly in a block-diagram form, illustrating an NC-EDM arrangement embodying the principles of the present invention.

FIG. 1 shows an EDM apparatus for machining an electrically conductive workpiece 1 with a tool electrode 2. The tool electrode 2 is here preferably a generic electrode whose active electrode contour is simple, such as cylindrical and generally independent of a contour to be machined in the workpiece 1, and is shown, for the illustrative purposes, in the form of a wire electrode for carrying out a traveling-wire EDM process. It is assumed that the process is to machine in the workpiece 1 a two-dimensional contour Sc including positions A, B and C and to continue machining in the direction of an arrow F. As is common, the wire electrode 1 is arranged to transverse the workpiece 1 in the form of a rectangular block and perpendicularly to the upper and the lower surfaces thereof. The wire electrode 1 is continuously transported from a supply reel (not shown) onto a suitable takeup means (not shown) and is guided between a pair of machining guides 3a and 3b to provide a continuously traveling and renewing linear cutting stretch in the region of the workpiece 1. The cutting region is also kept continuously supplied with a machining (dielectric) fluid, which may be deionized water from, say, one or two fluid delivery nozzles (not shown).

The workpiece 1 is mounted on a compound drive worktable assembly 4 in the form of a conventional cross-slide arrangement, comprising a first drive table 5 driven by a motor 6 via a leadscrew 7 and a second drive table 8 driven by a motor 9 via a leadscrew 10. The first drive table 5 is slidably movable on a base table 11 in the direction of an X-axis and the second drive table 8 is slidably movable on the first drive table 5 in the direction of a Y-axis. Encoders 12 and 13 may be provided in rotation sensing relationship with the X-axis leadscrew 7 and Y-axis leadscrew 10, respectively. The workpiece 1 is securely mounted on the second table 8 by means of a suitable clamp (not shown) so that energization of the motors 6 and 9 may cause a displacement of the workpiece 1 relative to the traveling wire electrode 2 transversely thereto.

An EDM power supply 14 is also shown to be connected electrically to the wire electrode 2 and the workpiece 1 and comprising a DC source 15, a power switch 16 shown in the form of a transistor and a resistor 17 connected in series therewith. The switch 16 is alternately turned on and off in response to a succession of signal pulses from an oscillator or signal pulse generator 18 to pulse the output of the DC source 15 and to provide a like succession of electrical voltage pulses of a controlled amplitude, pulse duration and pulse interval between the wire electrode 2 and the workpiece 1 across a machining gap G defined therebetween in the presence of the machining fluid. These voltage pulses result in successive, discrete, time-spaced electrical discharges effect to electroerosively remove material from the workpiece 1. An adaptive controller 19, which is of a known design and responsive to the machining gap G, is preferably provided to act on the DC source 14 and/or the signal pulse generator 18 so as to optimize the current magnitude or peak current Ip, the pulse duration τon and/or the pulse interval τoff of each individual effective electrical discharge. The adaptive controller 19 has its input which is shown as connected to the resistor 17 to respond to a gap current but which may alternatively be electrically connected so as to respond to a gap voltage, or both to the gap voltage and current.

To enable material removal to proceed so as to machine the desired contour Sc in the workpiece 1, the axis O of the traveling wire electrode 2 needs to be advanced effectively in the workpiece 1 along a path Se which corresponds to the contour Sc and is spaced therefrom generally by the radius D/2 of the wire electrode 2 plus the lateral overcut or the maximum size g of the machining gap G. A numerical controller 20 of conventional design is thus provided having data prestored or computed therein to enable advancement of the wire axis O in the workpiece 1 along the path Se. These data are converted into X-axis and Y-axis drive pulses which are furnished from the numerical controller 20 in the X-axis and Y-axis motors 6 and 9 via their respective driver circuits 21 and 22 to enable the corresponding advancement of the workpiece 1 relative to the traveling wire axis O. Here, each of the drive pulses applied to the X-axis and Y-axis motors 6 and 9 is set to achieve a prescribed unit distance, say 1 μm, of displacement of the workpiece 1 relative to the wire electrode 2 along the corresponding X- or Y-axis. The encoders 12 and 13 are provided to sense each incremental rotary advancement of the driven leadscrews 7 and 8 to apply feedback signals to the numerical controller 20, thus accomplishing closed-loop drive controls. The adaptive controller 19 responsive to the machining gap G has an additional output connected to the numerical controller 20 to optimally control the rate of commanded advance of the workpiece 1 and/or enable a backward movement thereof along the programmed path Se in response to the varying gap condition. To enable controlling the rate of commanded advance, the adaptive controller 19 is arranged to act on the clock generator in the numerical controller 20 to adaptively change the frequency of clock pulses and hence the rate of drive pulses issuing from the numerical controller 20 in accordance with the varying gap condition.

In accordance with an embodiment of the present invention, the system shown further includes a command-feed distance detecting unit 23, a machined-distance detecting unit 24 and a signal comparison unit 25. The machined-distance detecting unit 24 is designed to operate in response to the output of a discharge discriminator 26 which may as apparent be adapted to respond to a voltage drop at the resistor 17. The discharge discriminator 26 is connected via a pulse generator 27 with the detecting unit 24. The comparator 25 may have at its output a warning indicator 28 as will be described.

In the illustrated arrangement, the feed-command detecting unit 23 responds via the driver circuits 21 and 22 to the incremental drive signals furnished by the numerical controller 20 and is designed to produce a detection signal representing a commanded relative advancement to be effected between the traveling-wire electrode 2 and the workpiece 1 for a given time period T. The detecting unit 23 may thus produce a signal pulse each time either X-axis or Y-axis advance-driving command pulse is issued from the numerical controller 20 so that the number ηa of a train of such signal pulses outgoing from the detecting unit 23 for the time period T represents a distance Xa of the commanded relative advancement to be effected for that time period T inasmuch as each drive pulse is prescribed to achieve a predetermined unit distance Xao, say 1 μm, of the relative displacement. It will be apparent that when the numerical controller 20 is designed to allow a backward movement also with a series of retraction-driving command pulses, these pulses are, of course, excluded from response by the detecting unit 23. Thus, it can be assumed that the detecting unit 23 issues a signal pulse each time a command for one increment (e.g. 1 μm) of the relative advancement occurs in the numerical controller 20 and is applied to the X-axis motor 6 or the Y-axis motor 9.

Referring to the machined-distance detecting assembly 24, 26, 27, the discharge discriminator 26, which may be constituted by a monothreshold or multiple-threshold Schmitt-trigger circuit, monitors machining pulses applied between the electrode 2 and the workpiece 1 from the power supply 14 to selectively detect those pulses which have resulted in effective electrical discharges and to exclude such pulses as short-circuiting, open-circuit, arcing and other detective pulses which do not cause electroerosive material removal of the workpiece 1. Each time an effective electrical discharge is detected, the discharge discriminator 26 causes the pulse generator 27 to issue a pulse representing its development in the machining gap G.

Figure 2A:
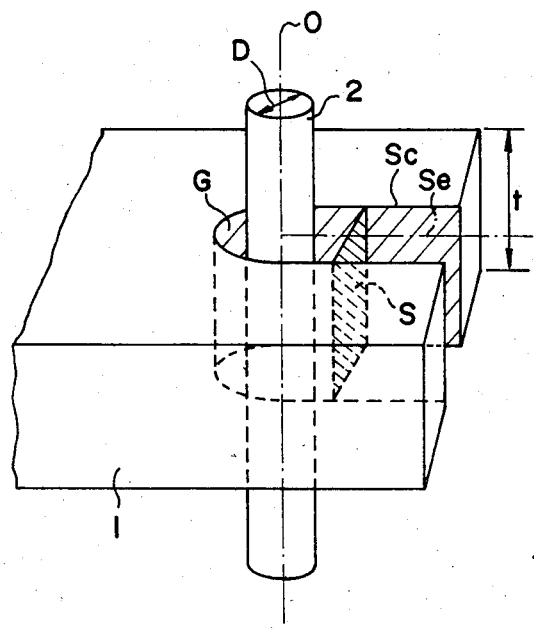
FIG. 2A is a perspective view, diagrammatically illustrating a workpiece being machined with a traveling-wire electrode.
Figure 2B:
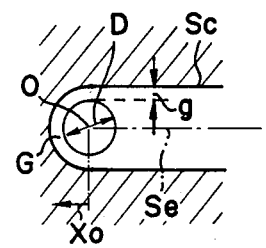
FIG. 2B is a transverse cross-sectional view of a machining region in the arrangement of FIG. 2A.

Now assuming that stock of an amount by weight W (in grams) is removed from the workpiece 1 for the given time period T, it must be assumed that the relative advance has actually occurred between the electrode 2 and the workpiece, having a distance X as expressed by the following equation:

$$X = \frac{W}{S \cdot \rho} \ (\mu m) \tag{1}$$

where S is, as shown in FIG. 2A, a planar area of the workpiece 1 through which material removal continues and ρ is the specific gravity of the workpiece 1. Since the amount of weight of stock removal W for the time period T is given by:

$$W = w \cdot n \tag{2}$$

where w is the amount by weight of stock removal per each effective electrical discharge and n is the number of effective electrical discharges caused in the time period T, and since, referring to FIGS. 2A and 2B, the area S is given by:

$$S = (2g + D) \cdot t \tag{3}$$

where D is the diameter of the electrode 2, g is the overcut and t is the thickness of the workpiece 1, the distance of material removal X effected in the given time period T can be expressed as follows:

$$X = \frac{w \cdot n}{(2g + D) \cdot t \cdot \rho} \tag{4}$$

Then, assuming that a number no of effective electrical discharges are effected to achieve a unit distance Xo of material removal; the expression (4) becomes $$X = Xo \cdot \eta \quad (5)$$

where $$Xo = \frac{w}{(2g + D) \cdot t \cdot \rho} \cdot no \quad (6)$$

or $$Xo = \frac{w}{S \cdot \rho} no \quad (7)$$

and $$\eta = n/no \quad (8)$$

Now, assuming that w, S (or g and D), t and $\rho$ are all fixed, and equating Xo to the commanded unit distance Xao (e.g. 1 μm) previously described, the number no can be determined from the expression (6) or (7) and hence pre-fixed.

Figure 3:
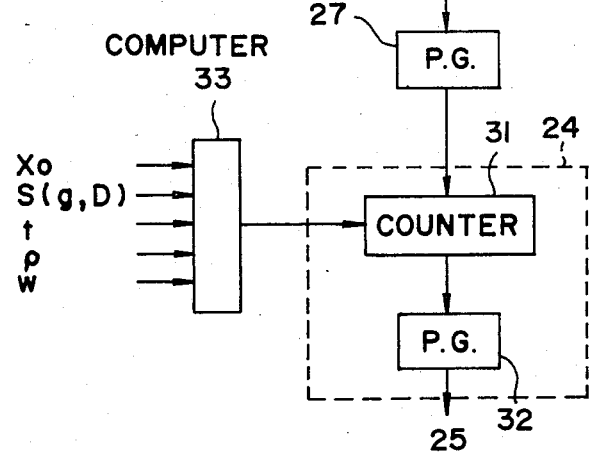
FIG. 3 is a schematic view in a block-diagram form illustrating one embodiment of a portion of the arrangement shown in FIG. 1.

As shown in FIG. 3, the detecting unit 24 may thus include a counter 31 and a further pulse generator 32. In the illustrated arrangement, the counter 31 may have a count level preset at the fixed number no equal to the number of effective electrical discharges required to achieve the unit distance of material removal Xo=Xao (e.g. 1 μm). Each time the counter 31 counting the pulses from the pulse generator 27 counts up the number no and thus each time the unit distance Xo is ascertained to be achieved, the counter 31 provides an output which causes the further pulse generator 32 to issue a single pulse. For the given time period T, the pulse generator 32 issues a number $\eta$ of signal pulses which represents a distance of actual material removal and hence of the relative displacement actually effected between the electrode 2 and the workpiece 1. The counter 31 as shown has an additional input leading from a computer 33 for establishing the preset count level no. The computer 33 has inputs to receive data for Xo, S or g and D, t, $\rho$ and w and is adapted to compute from these data the preset count level no.

Apart from the variable Xo which is a prescribed value (e.g. 1 μm), all of the other variable for the computation can be known once settings and conditions for a given EDM process are determined. The thickness t and the specific gravity $\rho$ are given once the workpiece 1 is identified while the variable D is the diameter of the electrode 2 which can be assumed to be constant. Furthermore, the amount of stock removal w per single effective electrical discharge and the overcut g are given by the following empirical formula:

$$w = kw \cdot \tau on^l \cdot Ip^m \quad (9)$$

and $$g = Kg \cdot \tau on^p \cdot Ip^q \quad (10)$$

where Kw, kg, l, m, p and q are constants determined by workpiece and electrode materials whereas $\tau$on and Ip are the pulse duration and the current magnitude of effective electrical discharges which can be substantially preset in the EDM power supply 14, 18 to meet the particular conditions selected. From the formula (3) and (10), the area S is likewise readily obtained. Thus, the direct computation of the number no within the computer 33 or preliminary computations of the variables w and g of S therein or in a separate computer may be carried out using as inputs the variables Kw, Kg, l, m, p, q, $\tau$on and Im and the foregoing relationships.

Referring back to FIG. 1 the comparator 25 is provided to respond to a train of signal pulses incoming from the commanded distance detecting unit 23 and representing a distance Xa of the commanded relative displacement to be effected for the given time period T and a train of signal pulses incoming from the machined-distance detecting unit 24 and representing a distance X of the actual relative displacement effected for that time period T, and to produce an output signal indicating a deviation of the machined distance from the commanded distance. A timing pulse generator 28 is provided to furnish the two detecting units 23 and 24 to ensure a synchronized initiation of the signal pulses therein or to hold the given time period T. The comparator 25 may include a differential counter which issues an output pulse when a deviation occurs between the number $\eta$a of of signal pulses incoming from the detection unit 23 and the number $\eta$ of signal pulses incoming from the detection unit 24. When the deviation exceeds an unacceptable limit; the output of the comparator 25 causes the warning indicator 28 to issue a warning signal which is audible or visible to the operator.

What is claimed is:

1. A numerically controlled method of electroerosively machining a workpiece with a tool electrode wherein a succession of electrical voltage pulses are applied between the tool electrode and the workpiece and at least partly result in effective electrical discharges across a machining gap to electroerosively remove material from the workpiece while drive means is furnished with a sequence of incrementally driving command signals from a numerical controller for relatively advancing one of the tool electrode and the workpiece into the other to continue machining of the workpiece along a programmed path, the method comprising the steps of:
    (a) sensing said command signals to produce a first detection signal representative of a commanded relative advance to be effected between the tool electrode and the workpiece along said programmed path for a given time period;
    (b) sensing the effective electrical discharges caused in the machining gap to produce a second detection signal representative of an actual advance effected between the tool electrode and the workpiece along such path in such time period; and
    (c) comparing said first and second detection signals to produce an output signal indicative of a deviation of said actual advance from said commanded advance, said first detection signal being a first train of signal pulses whose number for said time period is representative of a distance of said commanded advance for said time period and said second detection signal being a second train of signal pulses whose number for said given time period is representative of a distance of said actual advance for said time period.

2. The method defined in claim 1 wherein said first and second trains of signal pulses are differentially counted in step (c) to provide said output signal.

3. The method defined in claim 1 wherein each of said signal pulses of the first train is generated upon occurrence of each of said incrementally driving command signals representing a command of relative advance by a predetermined unit distance to be incrementally effected between the tool electrode and the workpiece.

4. The method defined in claim 3 wherein each of said signal pulses of the second train is generated upon occurrence of a predetermined number of said effective electrical discharges.

5. The method defined in claim 3 wherein each of said signal pulses of the second train is generated upon ascertaining that a unit distance of material removal nominally equal to said commanded unit distance of relative advance is achieved by a number of the effective electrical discharges caused in the machining gap.

6. The method defined in claim 4 or claim 5, further comprising, in conjunction with step (b), the steps of establishing a value for the amount of material removal effected by each effective electrical discharge and deriving from said value said number of effective electrical discharges.

7. The method defined in claim 4 or claim 5, further comprising, in conjunction with step (b), determining said unit distance of material removal at least from said predetermined unit distance of relative advance, and the amount of material removal per each effective electrical discharge and the area in the workpiece through which material removal occurs for said number of effective electrical discharges.

8. The method defined in claim 7, further comprising determining said amount of material removal per each effective electrical discharge as a function of the current magnitude and the pulse duration of said effective electrical discharge.

9. The method defined in claim 8, further comprising determining said area in the workpiece as a function of the current magnitude and the pulse duration of said effective electrical discharge.

10. The method defined in claim 7, further comprising determining said number of the effective electrical discharges from said predetermined unit distance of relative advance and the determined unit distance of material removal.

11. The method defined in claim 1 wherein said path is programmed to correspond to a contour to be machined in the workpiece and said tool electrode is a generic electrode whose machining surface contour is simple and generally independent in shape of said contour to be machined in the workpiece.

12. The method defined in claim 11 wherein said generic electrode is a continuous wire electrode.

13. An electroerosion machining apparatus having electrical power supply means for applying a succession of electrical voltage pulses between a tool electrode and a workpiece with the pulses at least partly resulting in effective electrical discharges across a machining gap to electroerosively remove material from the workpiece, and a numerical controller for furnishing drive means with a sequence of incrementally driving command signals to relatively advance one of the tool electrode and the workpiece into the other to continue machining of the workpiece along a predetermined path, the apparatus including:

first detection means responsive to said driving signals for producing a first detection signal in the form of a first train of signal pulses whose number for a given time period is representative of a commanded relative advance to be effected between the tool electrode and the workpiece along said predetermined path in said given time period;

second detection means responsive to the effective electrical discharges caused in the machining gap to produce a second detection signal in the form of a second train of signal pulses whose number for said time period is representative of an actual relative advance effected between the tool electrode and the workpiece along such path in such time period; and comparison means connected to said first and second detection means for comparing said first and second detection signals to produce an output signal indicative of a deviation of said actual advance from said commanded advance.

14. The apparatus defined in claim 13 wherein said comparison means includes means for differentially counting said first and said second trains of signal pulses.

15. The apparatus defined in claim 13 wherein said first detection means includes means for generating each of said signal pulses of said first train upon the occurrence of each of said incrementally driving amended signals and said second detection means includes means responsive to said effective electrical discharges for generating each of said signal pulses of said second train upon the occurrence of a predetermined number of said effective electrical discharges.

16. The apparatus defined in claim 13 wherein said second detection means includes means for ascertaining a unit distance of material removal nominally equal to said commanded unit distance of relative advance and generating a respective one of said signal pulses of said second train.

17. The apparatus defined in claim 13 wherein said tool electrode is a continuous wire electrode.

18. The apparatus defined in claim 13 wherein said path is programmed to correspond to a contour to be machined in the workpiece and said tool electrode is a generic electrode whose machining surface contour is generally independent in shape of the contour to be machined in the workpiece.

* * * * *